United States Patent
Rausch et al.

(10) Patent No.: US 7,123,940 B1
(45) Date of Patent: Oct. 17, 2006

(54) WIRELESS COMMUNICATION SYSTEM INCLUDING OMNI-DIRECTIONAL TRANSMITTER AND DIRECTIONAL RECEIVER

(75) Inventors: Walter F. Rausch, Shawnee, KS (US); Harry Perlow, Tarpon Springs, FL (US); Michael P. Denny, Chandler, AZ (US); Gary Thomas Schick, Overland Park, KS (US); Robert Garrett, Shawnee, KS (US); Robert Pippert, Lenexa, KS (US); George V. Moura, Gilbert, AZ (US); Anthony A. Panella, Littleton, CO (US)

(73) Assignee: Sprint Communications Company L.P., Overland Park, KS (US)

( * ) Notice: Subject to any disclaimer, the term of this patent is extended or adjusted under 35 U.S.C. 154(b) by 544 days.

(21) Appl. No.: 10/083,303

(22) Filed: Feb. 26, 2002

Related U.S. Application Data

(60) Provisional application No. 60/271,834, filed on Feb. 27, 2001.

(51) Int. Cl.
 *H04M 1/00* (2006.01)
 *H04H 1/00* (2006.01)
(52) U.S. Cl. .................. 455/562.1; 455/561; 455/3.01; 455/3.05
(58) Field of Classification Search ................ 455/561, 455/562.1, 3.01–3.02, 3.04–3.06; 370/328, 370/329, 330, 486–490, 381, 399, 397; 725/62, 725/73
See application file for complete search history.

(56) References Cited

U.S. PATENT DOCUMENTS

| | | | |
|---|---|---|---|
| 5,347,304 A | | 9/1994 | Moura et al. |
| 5,437,052 A | * | 7/1995 | Hemmie et al. ............... 725/73 |
| 5,559,808 A | * | 9/1996 | Kostreski et al. ........... 370/517 |
| RE35,774 E | | 4/1998 | Moura et al. |
| 6,069,885 A | * | 5/2000 | Fong et al. .................. 370/336 |
| 6,400,697 B1 | * | 6/2002 | Leung et al. ................ 370/328 |
| 6,657,982 B1 | * | 12/2003 | Fong et al. .................. 370/336 |
| 2001/0003443 A1 | * | 6/2001 | Velazquez et al. .......... 342/367 |

OTHER PUBLICATIONS

Dawson, Fred, "Broadband Wireless for Biz: Rumblings," Network Solutions Xchange, Oct. 2000.

* cited by examiner

*Primary Examiner*—Jean Gelin
*Assistant Examiner*—Bryan Fox

(57) ABSTRACT

A wireless communication system includes a transmitting antenna, a transmitter, a directional receiving antenna, a receiver, and a communication interface. The transmitter transmits first wireless signals via a transmitting antenna. A directional receiving antenna has an angle of less than forty five degrees and the directional receiving antenna is directed toward an angular area of less than forty five degrees. A receiver receives second wireless signals via the directional receiving antenna. A communication interface is connected to the receiver, the transmitter, and a communication network. The communication interface provides the communication services between a communication network and the user communication devices.

14 Claims, 11 Drawing Sheets

WIRELESS COMMUNICATION SYSTEM INCLUDING OMNI-DIRECTIONAL TRANSMITTER AND DIRECTIONAL RECEIVER

RELATED APPLICATIONS

This application claims the benefit of provisional application 60/271,834, filed Feb. 27, 2001 which hereby is incorporated by reference into this application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to a wireless communication system.

2. Description of the Prior Art

People and businesses are demanding higher bandwidths from their communication providers. Consequently, the communication providers are looking for ways to increase the bandwidth of their systems using broadband technologies. Broadband technologies are generally referred to as systems that deliver a bandwidth at or above 64 kbps. Broadband technologies can communicate over downstream channels and upstream channels. The customer receives data from another device or system over the downstream channels. The customer transmits data to another device or system over the upstream channels.

Broadband Wireline Systems

One example of a broadband technology is Digital Subscriber Line (DSL) service. DSL service can carry both voice signals and data signals at the same time in both directions. DSL service also can carry call information and customer data. DSL service is typically comprised of twisted-pair wires that connect a customer to a central office. The central office comprises a Digital Subscriber Line Access Multiplexer (DSLAM) that provides the DSL service to the customer. Unfortunately, the speed of DSL service is limited by the distance between the customer and the DSLAM. Customers located too far from the DSLAM may not be able to receive high-speed service. Also, there may not be enough customers within a particular area to make it economical to install a DSLAM. The quality of DSL service is also limited by the quality of the copper wire that connects the customer to the DSLAM. Furthermore, DSL service does not work over Digital Loop Carrier (DLC) lines.

Another broadband technology is cable modem service. The cable modem communicates with a device or system over a coaxial cable. The coaxial cable is typically the same coaxial cable used to receive cable television. The cable modem service can be one-way or two-way. In a two-way system, the coaxial cable carries both the upstream channels and the downstream channels. In a one-way system, the cable modem receives data on the downstream channels over the coaxial cable and transmits data on the upstream channels over a phone line. Unfortunately, the cable modem uses up valuable bandwidth on the phone line in the one-way system. Also, the upstream bandwidth is small over a phone line.

Broadband Wireless Systems

Another broadband technology is broadband wireless service. Customers that subscribe to broadband wireless service communicate with a head end. In a one-way wireless system, a transmitter antenna for the head end broadcasts wireless signals to the customer on the downstream channels. The transmitter antenna is a satellite antenna or a land-based antenna. The customer transmits data to the head end over another medium, such as a phone line or a cable modem, on the upstream channels. One example of a one-way wireless system is a Digital Satellite System (DSS) from DIRECTV.

A specific type of broadband wireless system communicates over Multichannel Multipoint Distribution Service (MMDS) frequencies and Multipoint Distribution Service (MDS) frequencies. The MMDS frequencies range from 2500 MHz and 2686 MHz. The MDS frequencies range from 2150 MHz to 2162 MHz. In a typical MMDS system, the bandwidth of the upstream channels is about 6 MHz. The upstream bandwidth is divided into subchannels. Each subchannel has a bandwidth of 200 kHz. In other examples, each subchannel has a bandwidth of 166 KHz.

A head end manages the upstream and downstream channels with the customer. The head end also interfaces the customer with communication networks such as the Internet. The head end includes a base antenna comprised of a transmitter antenna and one or more receiver antennas. MMDS requires a line of sight between devices that are communicating. Therefore, the antennas are placed on a high building or a mountain to establish lines of sight with the customers.

The transmitter antenna is omni-directional and broadcasts data from the head end to the customers on the downstream channels. In a two-way wireless system, the receiver antennas are positioned to receive MMDS signals transmitted from customers to the head end on the upstream channels. Each receiver antenna is positioned to receive MMDS signals from customers located within a certain area. The areas formed by the antennas are referred to as sectors. The sectors have designated frequency ranges or designated channels.

The head end is comprised of an upstream manager and a downstream manager that control transmissions on the upstream channels and the downstream channels, respectively. As stated above, the upstream channels and the downstream channels are divided into subchannels. One upstream subchannel is a contention channel reserved for signaling, while the remaining subchannels are bearer channels.

In the broadband wireless system, a wireless broadband router is located at a customer premises. The wireless broadband router communicates with the upstream manager and the downstream manager to exchange data. The upstream manager generally operates the channels and/or subchannels in four states: idle, contention, polling, and dedicated. In the idle state, the channels are idle. In the contention state, the upstream manager generates and transmits control signals over one or more subchannels.

For the polling and dedicated states, the upstream manager polls numerous wireless broadband routers to allocate use of the subchannels. Polling is a round robin process to determine which wireless broadband router has access to a subchannel. The upstream manager maintains a queue of the active wireless broadband routers to determine which wireless broadband router is next to transmit over a subchannel for a period of time. The upstream manager keeps an inventory of open subchannels and waiting wireless broadband routers in the queue.

Sectorization

Other communication systems such as cellular communication systems and personal communication service systems use sectorization. These systems use 60, 90, and 120 degrees sectors to increase capacity. Military radars use apertures as small as 2 degrees.

In this broadband wireless system, the downstream channels handle more capacity than upstream channels due to licensing requirements for MMDS. In order to increase upstream capacity, the broadband wireless system receives wireless signals from 45 degree sectors. However, the 45 degree sectors in the broadband wireless system do not have the capacity to support numerous users in a metropolitan area.

Another problem with the 45 degree sector is a problem of re-reflection. FIG. 7 depicts an illustration of a sector map of the broadband wireless system in the prior art. The broadband wireless system provides communication services to users in 8 45 degree sectors. These 8 sectors are sector #1 710, sector #2 720, sector #3 730, sector #4 740, sector #5 750, sector #6 760, sector #7 770, and sector #8 780. The sector #1 710, the sector #3 730, the sector #5 750, and the sector #7 770 use a first set of MMDS frequencies. The sector #2 720, the sector #4 740, the sector #6 760, and the sector #8 780 use a second set of MMDS frequencies. The sector #1 710 includes a receiver antenna 712, an obstruction 714, and a wireless broadband router 716. The obstruction 714 could be any object such as other communication towers or trees. The sector #3 730 includes a receiver antenna 732 and a wireless broadband router 736. The other receiver antennas and various obstructions are not shown for the sake of simplicity. Numerous wireless broadband routers are also not shown for the sake of simplicity.

A first re-reflection problem is the wireless broadband router 736 in the sector #3 730 transmits wireless signals that reflect off the obstruction 714 into the receiver antenna 712 in the sector #1 710. Thus, due to the operation of the sector #1 710 and the sector #3 730 in the same first frequency set, the wireless signals of the wireless broadband router 736 in the sector #3 730 interferes in the operation of the sector #1 710. Another problem is the wireless broadband router 716 located behind the obstruction 714 uses increased power to overcome the obstruction 714. The power that the wireless broadband router 716 uses is limited by the hardware and licensing restrictions. The increased power creates greater interference and noise for the neighboring sectors.

Unfortunately, the broadband wireless systems that use 45 degree sectors is not effective in supporting numerous users in a metropolitan area. Also, the broadband wireless systems that use 45 degree sectors does not operate effectively due to problems associated with re-reflection.

SUMMARY OF THE INVENTION

The invention helps solve the above problems by providing communication services to user communication devices in geographic areas with angular areas of less than forty five degrees. A wireless communication system includes a transmitting antenna, a transmitter, a directional receiving antenna, a receiver, and a communication interface. The transmitter transmits first wireless signals via a transmitting antenna. A directional receiving antenna has an angle of less than forty five degrees and the directional receiving antenna is directed toward an angular area of less than forty five degrees. A receiver receives second wireless signals via the directional receiving antenna. A communication interface is connected to the receiver, the transmitter, and a communication network. The communication interface provides the communication services between a communication network and the user communication devices.

In one embodiment, the first wireless signals are in the Multichannel Multipoint Distribution Service (MMDS) frequency range. In another embodiment, the first wireless signals are in the Multipoint Distribution Service (MDS) frequency range. In one embodiment, the second wireless signals are in the Multichannel Multipoint Distribution Service (MMDS) frequency range. In another embodiment, the second wireless signals are in the Multipoint Distribution Service (MDS) frequency range. In some embodiments, the user communication devices comprise wireless broadband routers. In some embodiments, the angle of the directional receiving antenna is thirty six degrees, twenty four degrees, or twelve degrees. In some embodiments, the communication interface comprises a downstream manager and an upstream manager.

When a three hundred and sixty degree coverage area is divided into smaller coverage areas, the capacity of users in the communication systems is increased because more equipment is used to serve the smaller coverage areas. Also, with smaller coverage area, users have better response time because their respective equipment for the smaller coverage area handles less overall users. Smaller coverage area also reduces interference problems associated with re-reflection.

BRIEF DESCRIPTION OF THE DRAWINGS

The same reference number represents the same element on all drawings.

DETAILED DESCRIPTION OF THE PREFERRED EMBODIMENT

Broadband Wireless System—FIGS. 1–6

FIGS. 1–6 depict a specific example of a broadband wireless system in accord with the present inventions. Those skilled in the art will appreciate numerous variations from this example that do not depart from the scope of the inventions. Those skilled in the art will also appreciate that various features described below could be combined with other embodiments to form multiple variations of the inventions. Those skilled in the art will appreciate that some conventional aspects of FIGS. 1–6 have been simplified or omitted for clarity.

Figure 1:
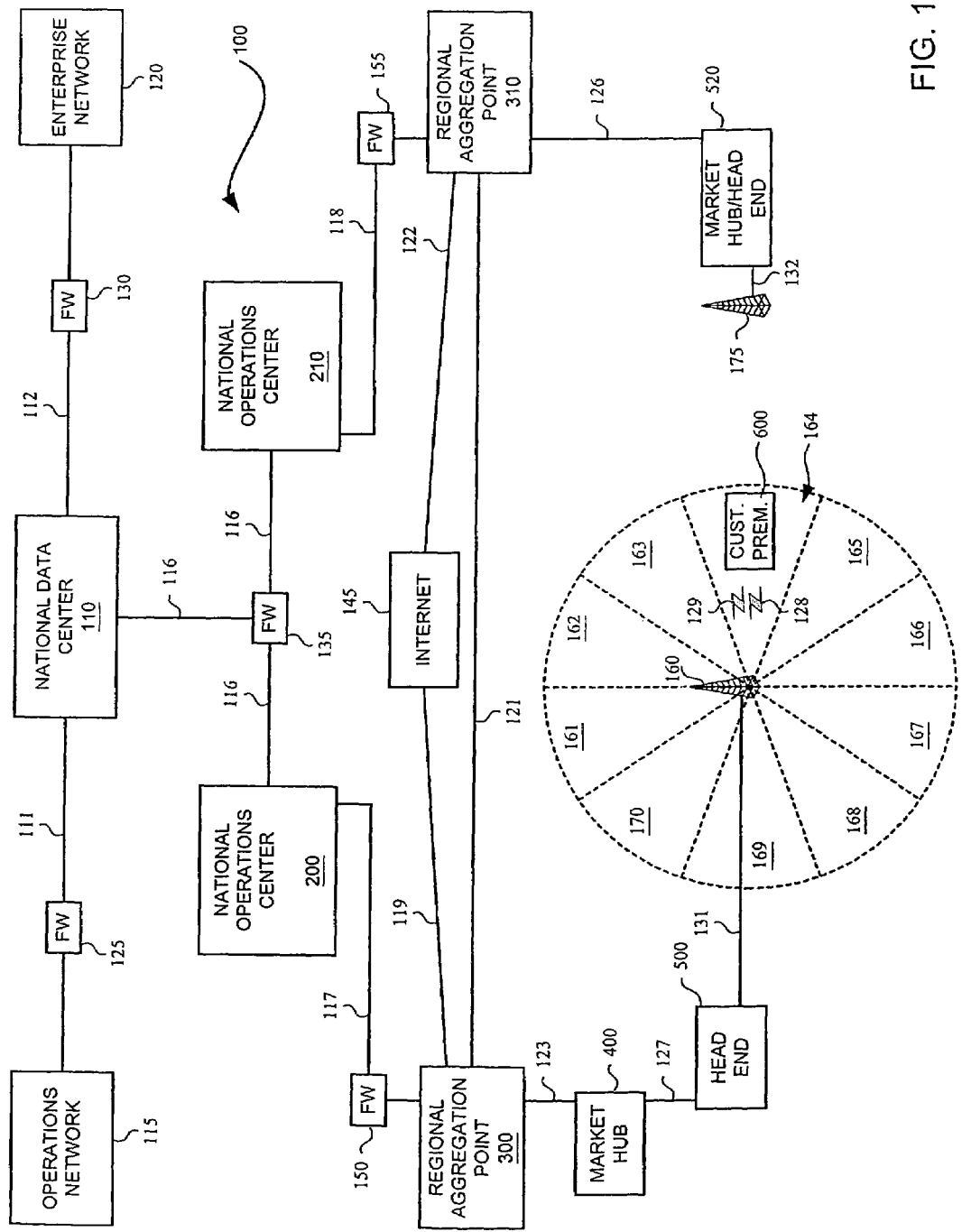
FIG. 1 is a block diagram of a broadband wireless system in an example of the invention.

FIG. 1 is a block diagram that illustrates a broadband wireless system 100 in an example of the invention. The broadband wireless system 100 is comprised of a national data center 110, an operations network 115, an enterprise network 120, a national operations center 200, a national operations center 210, an Internet 145, a regional aggregation point 300, a regional aggregation point 310, a market hub 400, a head end 500, a base antenna 160, a market hub/head end 520, a base antenna 175, and a customer premises 600.

The national data center 110 is configured to compile and display network information for the broadband wireless system 100. Network information is data that can be evaluated to operate a communication network, including performance information, fault information, billing information, and customer information.

The national data center 110 is comprised of systems that help to manage the broadband wireless system 100. Some of the systems are as follows. A national performance management system is configured to collect and store performance information for the broadband wireless system 100. The operation of a national performance management system is further discussed in FIG. 2. A national FTP server is configured to transfer large files based on File Transfer Protocol. A national RADIUS server is configured to handle user-logins and security for the national data center 110. A national Domain Naming System (DNS) server is configured to translate the domain names of host computers to IP addresses. A billing system running Portal Software is configured to generate billing records for users of the broadband wireless system 100. A network management system from Visual Networks is configured to provide a service level management and reporting service. A customer service server running Primus software from Primus Knowledge Solutions is configured to collect and process customer and product information. An ISA proxy server is configured to provide a firewall to users accessing the national data center 110. A fault detection system from Cable Master, Inc. is configured to detect and locate faults on the broadband wireless system 100. A fault management system running NetCool from Micromuse, Inc. is configured to collect and process fault information for the broadband wireless system 100. A fault reporting system from Vantive Corp is configured to provide detailed information on faults occurring on the broadband wireless system 100.

The operations network 115 is configured to process billing information, customer information, product ordering information, and other information generated from the broadband wireless system 100. The enterprise network 120 is an internal employee network configured to provide certain employees access to the network information for the broadband wireless system 100.

The national operations center 200 is configured to route data within the broadband wireless system 100, collect network information for the broadband wireless system 100, and store the network information. The national operations center 200 is discussed in further detail in FIG. 2. The regional aggregation point 300 is configured to route data within the broadband wireless system 100, collect network information for the broadband wireless system 100, and store the network information. The regional aggregation point 300 is discussed in further detail in FIG. 3. The market hub 400 is configured to route data within the broadband wireless system 100, collect network information for the broadband wireless system 100, and store the network information. The market hub 400 is discussed in further detail in FIG. 4. The head end 500 is configured to communicate with a customer premises over a wireless link using the base antenna 160 and collect network information. The head end 500 is discussed in further detail in FIG. 5. The customer premises 600 is configured to communicate with the head end 500 over a wireless link. The customer premises 600 is discussed in further detail in FIG. 6.

The broadband wireless system 100 could include secondary data centers (not shown) that correspond with the national operation centers 200 and 210. The secondary data centers could be comprised of the following systems. A national performance management system that is configured to collect and store performance information for the broadband wireless system 100. The operation of a national performance management system is further discussed in FIG. 2. A national FTP test server that is configured to test the transfer of large files based on File Transfer Protocol. A national RADIUS server that is configured to handle user-logins and security for the secondary data center. A national DNS server that is configured to translate the names of host computers to addresses. The base antenna 160 forms ten sectors 161–170. The customer premises 600 is located in the sector 164.

The following table describes how the components in FIG. 1 are connected. The first and second columns describe the components and the third column describes the link that connects the components.

| Component | Component | Link |
| --- | --- | --- |
| National data center 110 | Operations network 115 | 111 |
| National data center 110 | Enterprise network 120 | 112 |
| National data center 110 | National operations center 200 | 116 |
| National data center 110 | National operations center 210 | 116 |
| National operations center 200 | National operations center 210 | 116 |
| National operations center 200 | Regional aggregation point 300 | 117 |
| National operations center 210 | Regional aggregation point 310 | 118 |
| Regional aggregation point 300 | Internet 145 | 119 |
| Regional aggregation point 300 | Regional aggregation point 310 | 121 |
| Regional aggregation point 310 | Internet 145 | 122 |
| Regional aggregation point 300 | Market hub 400 | 123 |
| Regional aggregation point 310 | Market hub/Head end 520 | 126 |
| Market hub 400 | Head end 500 | 127 |
| Head end 500 | Base antenna 160 | 131 |
| Base Antenna 160 | Customer premises 600 | 128–29 |
| Market hub/Head end 520 | Base antenna 175 | 132 |

The links 111–112 and 116–118 include firewalls (FW) 125, 130, 135, 150, and 155, respectively. A firewall is a system, hardware or software, configured to limit access to a system or network. The links 111–112, 116–119, 121–123, and 126–127 are DS-3 connections. Those skilled in the art will appreciate that the links 111–112, 116–119, 121–123, and 126–127 could be any type of electrical or optical connection including T-1, T-3, OC-3, OC-12, or OC-48 connections. Those skilled in the art will appreciate that the links 111–112, 116–119, 121–123, and/or 126–127 could include redundant connections to increase reliability of the links.

The broadband wireless system 100 operates as follows. The customer premises 600 communicates with systems within the Internet 145. For instance, the customer premises 600 could download a web page from a server in the Internet 145. To download the web page, the customer premises 600 accesses the server through the head end 500, the market hub 400, and the regional aggregation point 300.

The national operations centers 200 and 210 collect network information for the broadband wireless system 100. The national operations center 200 retrieves network information from the region aggregation point 300, the market hub 400, the head end 500, and the customer premises 600. The national operations center 200 shares the network information with the national data center 110. Network information comprises performance information and fault information. The performance information is information that describes how a communication network is operating, such as throughput rates, number of transmission units, and signal-to-noise ratio. The fault information is information that identifies failures in a communication network, such as alarms and indicators of failed communication devices. The national operations center 200 processes and stores the network information. The national operations center 210 is a mirror system to the national operations center 200. The national operations center 210 retrieves and stores the same network information as the national operations center 200. Thus, if the national operations center 200 fails, then the national operations center 210 takes over without dramatically affecting the broadband wireless system 100.

The regional aggregation point 300 routes data through the broadband wireless system 100 and collects network information for the broadband wireless system 100. The regional aggregation point 300 retrieves network information from the market hub 400, the head end 500, and the customer premises 600. The regional aggregation point 300 stores the network information and shares the network information with the national operations center 200. The regional aggregation point 310 operates similar to the regional aggregation point 300.

The market hub 400 routs data from the head end 500 to the regional aggregation point 300 and vice-versa, and collects network information for the broadband wireless system 100. The market hub 400 retrieves network information from the head end 500 and the customer premises 600. The market hub 400 stores the network information and shares the network information with the regional aggregation point 300.

The head end 500 interfaces the customer premises 600 with other components in the broadband wireless system 100 and routes data from the customer premises 600 to the market hub 400 and vice-versa. The head end 500 communicates with the customer premises 600 through the base antenna 160. The head end 500 collects network information for the broadband wireless system 100. The head end 500 transfers the network information to the market hub 400, the regional aggregation point 300, and/or the national operations center 200. The market hub/head end 520 operates similar to the market hub 400 and the head end 500.

The customer premises 600 exchanges data with the head end 500 over the wireless links 128 and 129. The customer premises 600 has two-way wireless communication with the head end 500 because both the downstream and upstream channels are over the wireless links 128 and 129.

Figure 2:
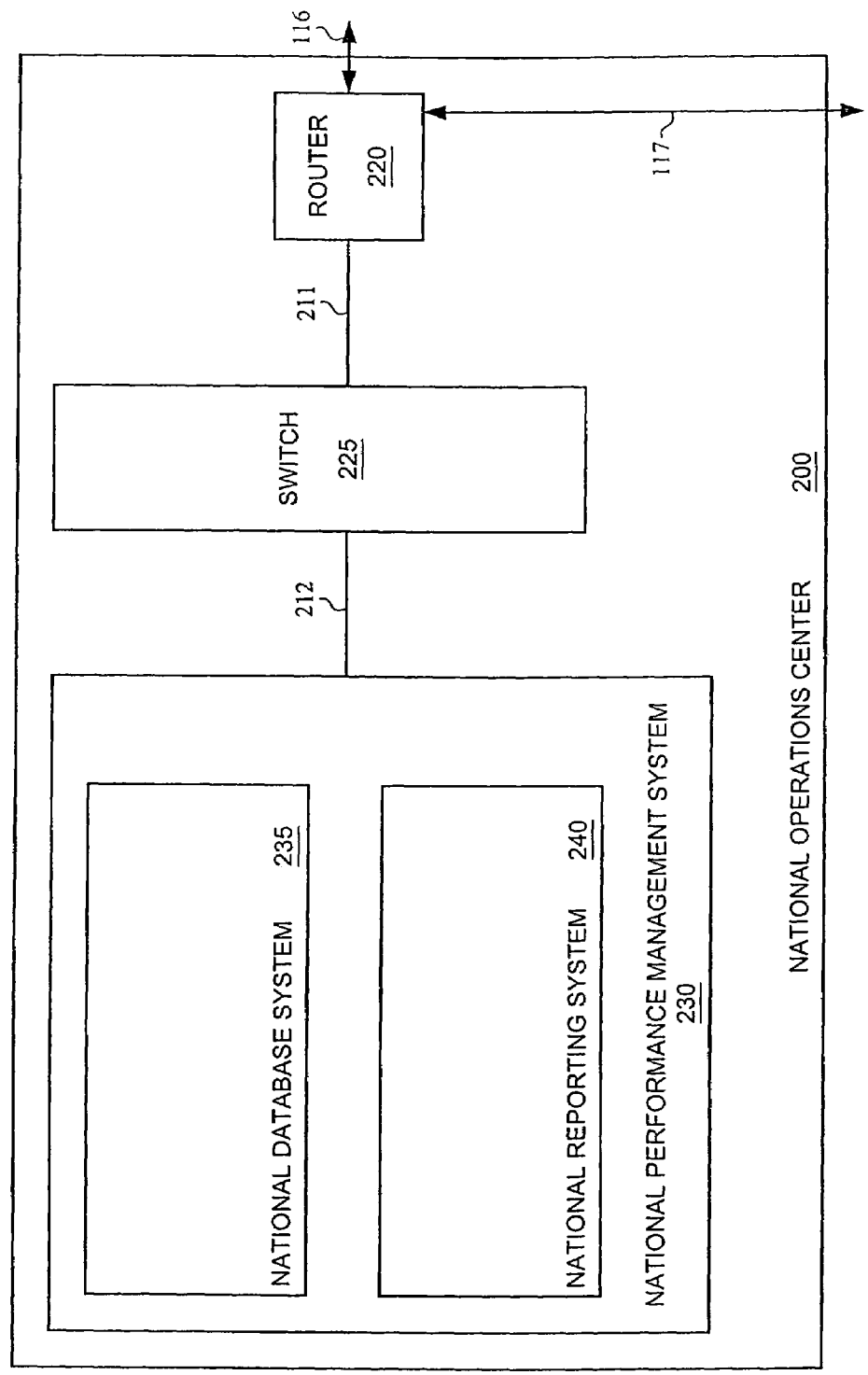
FIG. 2 is a block diagram of a national operations center in an example of the invention.

FIG. 2 is a block diagram that illustrates the national operations center 200 in an example of the invention. The national operations center 200 is comprised of a router 220, a switch 225, and a national performance management system 230. The national performance management system 230 is comprised of a national database system 235 and a national reporting system 240.

The national performance management system 230 is configured to collect, store, and report performance information for the broadband wireless system 100. The national database system 235 is configured to store performance information for the broadband wireless system 100. The national database system 235 is an Oracle database. The national reporting system 240 is configured to report the performance information for the broadband wireless system 100. The national reporting system 240 is an Apache web server.

The router 220 connects with the national data center 110 and the national operations center 210 over the link 116, and with the regional aggregation point 300 over the link 117. The router 220 connects with the switch 225 over a link 211. The link 211 is a Gigabit Ethernet connection. The switch 225 connects with the national performance management system 230 over a link 212.

In operation, the national performance management system 230 collects performance information from other components in the broadband wireless system 100. The national performance management system 230 communicates with the other components in the broadband wireless system 100 through the switch 225 and the router 220 to collect the performance information. The operation of the router 220 and the switch 225 is well known to those skilled in the art and is omitted for the sake of brevity. The national database system 235 stores the collected performance information. The national reporting system 240 retrieves the performance information from the national database system 235 and provides user-friendly formats of the performance information. Examples of the user-friendly formats are data flies and HTML files. The national reporting system 240 provides other systems access to the performance information. For instance, a user system within the Internet 145 could access the national reporting system 240 and view the performance information using a web browser. Also, the national data center 110 could retrieve the performance information from the national reporting system 240 through a File Transfer Protocol (FTP) command and store the performance information.

Figure 3:
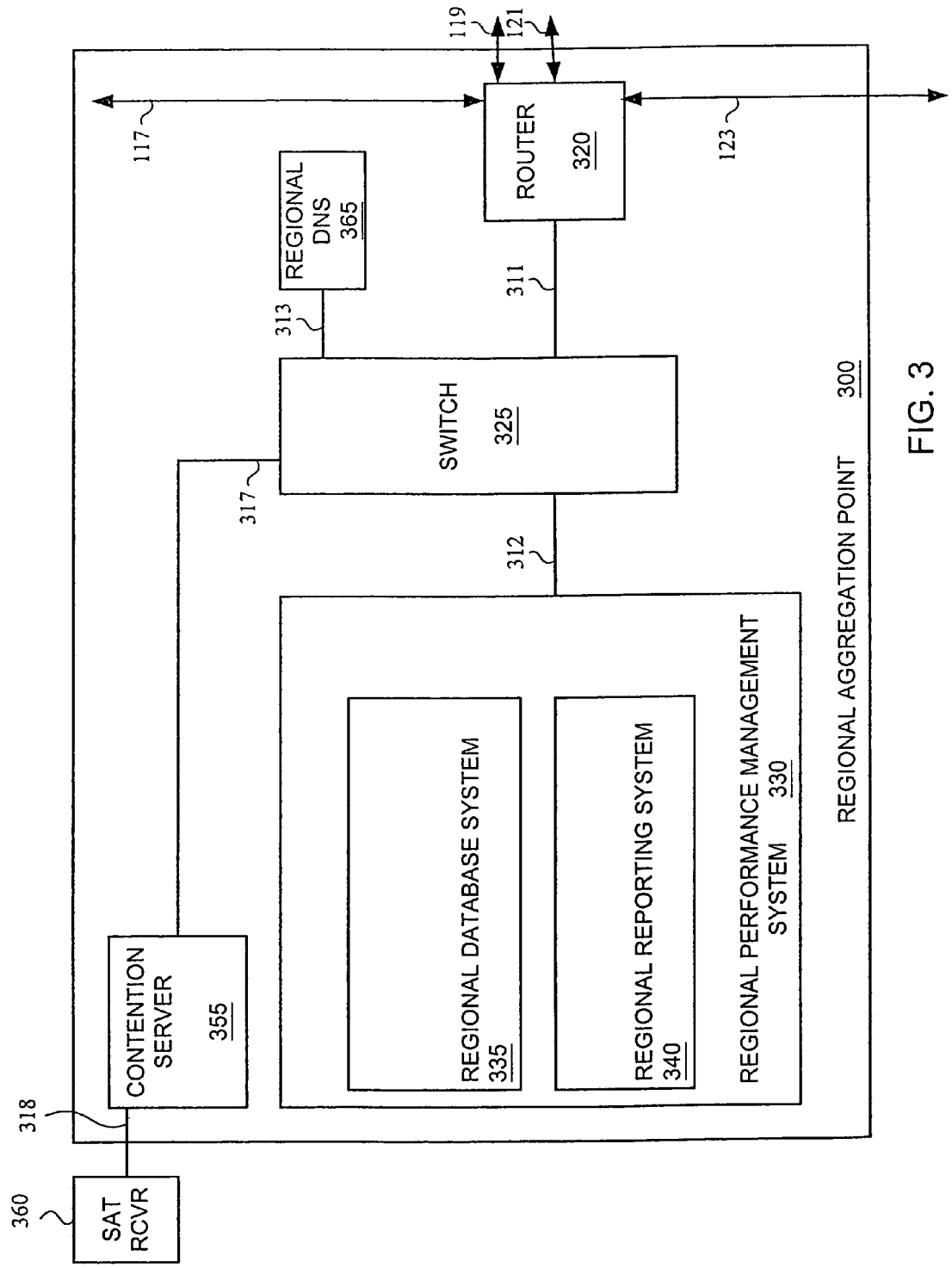
FIG. 3 is a block diagram of a regional aggregation point in an example of the invention.

FIG. 3 is a block diagram that illustrates the regional aggregation point 300 in an example of the invention. The regional aggregation point 300 is comprised of a router 320, a switch 325, a regional performance management system 330, a contention server 355, a satellite receiver 360, and a regional DNS server 365. The regional performance management system 330 is comprised of a regional database system 335 and a regional reporting system 340.

The router 320 is a GSR 12016 router from Cisco Systems. The switch 325 is a 6506 switch from Cisco Systems. The regional performance management system 330 is configured to collect, store, and report performance information for the broadband wireless system 100. The regional database system 335 is configured to store performance information for broadband wireless system 100. The regional database system 335 is an Oracle database. The regional reporting system 340 is configured to report performance information for the broadband wireless system 100. The regional reporting system 340 is an Apache web server. The contention server 355 and the satellite receiver 360 are from Cidera Co. The satellite receiver 360 is a Global Positioning System (GPS) receiver. The region DNS server 365 is a Netra 1145 server from Sun Microsystems that is configured to translate the domain names of host computers to IP addresses.

The router 320 connects with the national operations center 200, the Internet 145, the regional aggregation point 310, and the market hub 400 over the links 117, 119, 121, and 123, respectively. The router 320 connects with the switch 325 over a link 311. The link 311 is a Gigabit Ethernet connection. The switch 325 connects with the regional performance management system 330 over a link 312. The switch 325 connects with the contention server 355 over a link 317. The contention server 355 connects with the satellite receiver 360 over a link 318. The link 318 is a coaxial cable. The switch 325 connects with the regional DNS server 365 over a link 313.

In operation, the regional performance management system 330 collects performance information for the broadband wireless system 100. The regional performance management system 330 communicates with other components in the broadband wireless system 100 through the switch 325 and the router 320 to collect the performance information. The operation of the router 320 and the switch 325 is well known to those skilled in the art and is not discussed for the sake of brevity. The regional database system 335 stores the collected performance information. The regional reporting system 340 retrieves the performance information from the regional database system 335 and provides user-friendly formats of the performance information. Examples of the user-friendly formats are data files and HTML files. The regional reporting system 340 provides other systems access to the performance information. For instance, a user system within the Internet 145 could access the regional reporting system 340 and view the performance information using a web browser. Also, the national performance management system 230 could retrieve the performance information from the regional reporting system 340 for storage in the national database system 235.

The contention server 355 receives configuration information from a content delivery network through the satellite receiver 360. The configuration information is used to pre-configure the regional performance management system 330. The configuration information is also used to update or re-configure the regional performance management system 330.

Figure 4:
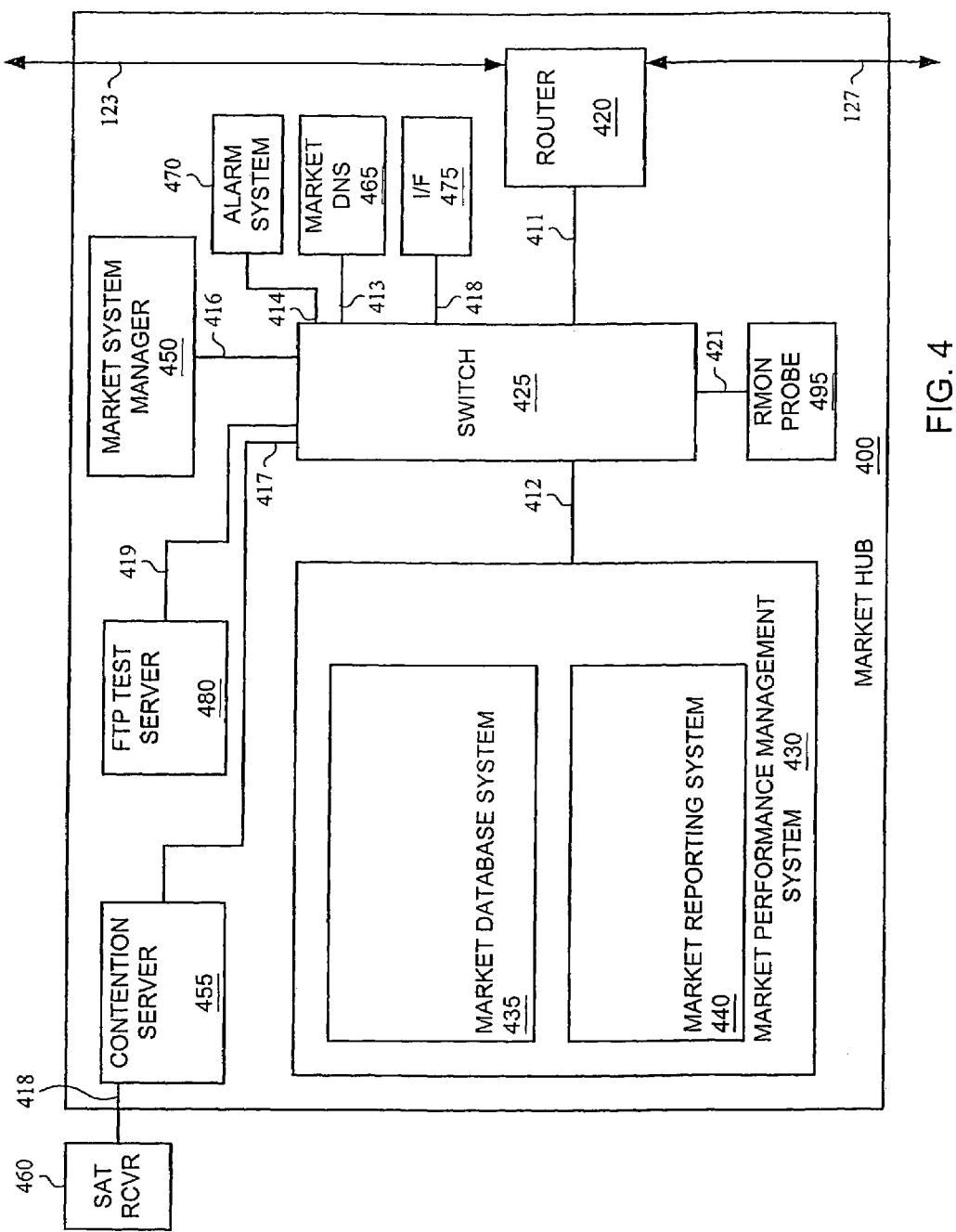
FIG. 4 is a block diagram of a market hub in an example of the invention.

FIG. 4 is a block diagram that illustrates the market hub 400 in an example of the invention. The market hub 400 is comprised of a router 420, a switch 425, a market performance management system 430, a market system manager 450, a contention server 455, a satellite receiver 460, a market DNS server 465, an alarm system 470, an interface 475, an FTP test server 480, and an RMON probe 495. The market performance management system 430 comprises a market database system 435 and a market reporting system 440.

The router 420 is a 7507 router from Cisco Systems. The switch 425 is a 6506 switch from Cisco Systems. The market performance management system 430 is configured to collect, store, and report performance information for the broadband wireless system 100. The market database system 435 is configured to store performance information for the broadband wireless system 100. The market database system 435 is an Oracle database. The market reporting system 440 is configured to report performance information for the broadband wireless system 100. The market reporting system 440 is an Apache web server. The market system manager 450 is a CyberManager 2000 (CMG-2000) from Hybrid Networks, Inc. The contention server 455 and the satellite receiver 460 are from Cidera Co. The satellite receiver 460 is a Global Positioning System (GPS) receiver. The market DNS server 465 is a Netra 1145 server from Sun Microsystems that is configured to translate the names of host computers to addresses. The alarm system 470 is an AIScout system from Applied Innovations, Inc. that is configured to monitor the broadband wireless system 100. The interface 475 is a Cybex interface configured to provide a computer interface to upstream and downstream managers in the head end 500. The upstream and downstream managers will be discussed further in FIG. 5. The FTP test server 480 is configured to test large file transfers based on File Transfer Protocol. The RMON probe 495 is a NetScout probe from NetScout Systems, Inc. that is configured to capture and define traffic information passing through a given point using RMON standards.

The router 420 connects with the regional aggregation point 300 and the head end 500 over the links 123 and 127, respectively. The router 420 connects with the switch 425 over a link 411. The link 411 is a Gigabit Ethernet connection. The switch 425 connects with the market performance management system 430 over a link 412. The switch 425 connects with the market system manager 450 over a link 416. The switch 425 connects with the contention server 455 over a link 417. The contention server 455 connects with the satellite receiver 460 over a link 418. The link 418 is a coaxial cable. The switch 425 connects with the market DNS server 465 over a link 413. The switch 425 connects with the alarm system 470 over a link 414. The switch 425 connects with the interface 475 over a link 418. The switch 425 connects with the FTP test server 480 over a link 419. The switch 425 connects with the RMON probe 495 over a link 421.

In operation, the market performance management system 430 collects performance information for the broadband wireless system 100. The market performance management system 430 communicates with other components in the broadband wireless system 100 through the switch 425 and the router 420 to collect the performance information. The operation of the router 420 and the switch 425 is well known to those skilled in the art and is not discussed for the sake of brevity. The market database system 435 stores the collected performance information. The market reporting system 440 retrieves the performance information from the market database system 435 and provides user-friendly formats of the performance information. Examples of the user-friendly formats are data files and HTML files. The market reporting system 440 provides other systems access to the performance information. For instance, a user system within Internet 145 could access the market reporting system 440 and view the performance information using a web browser. Also, the national performance management system 230 and/or the regional performance management system 330 could retrieve the performance information from the market reporting system 440 for storage in the national database system 235 and the regional database system 335, respectively.

The market system manager 450 monitors and stores routing information for upstream and downstream routing within the broadband wireless system 100. The market system manager 450 provides other systems access to the routing information.

The contention server 455 receives configuration information from a content delivery network through the satellite receiver 460. The configuration information is used to pre-configure the market performance management system 430 or the market system manager 450. The configuration information is also used to update or re-configure the market performance management system 430 or the market system manager 450.

Figure 5:
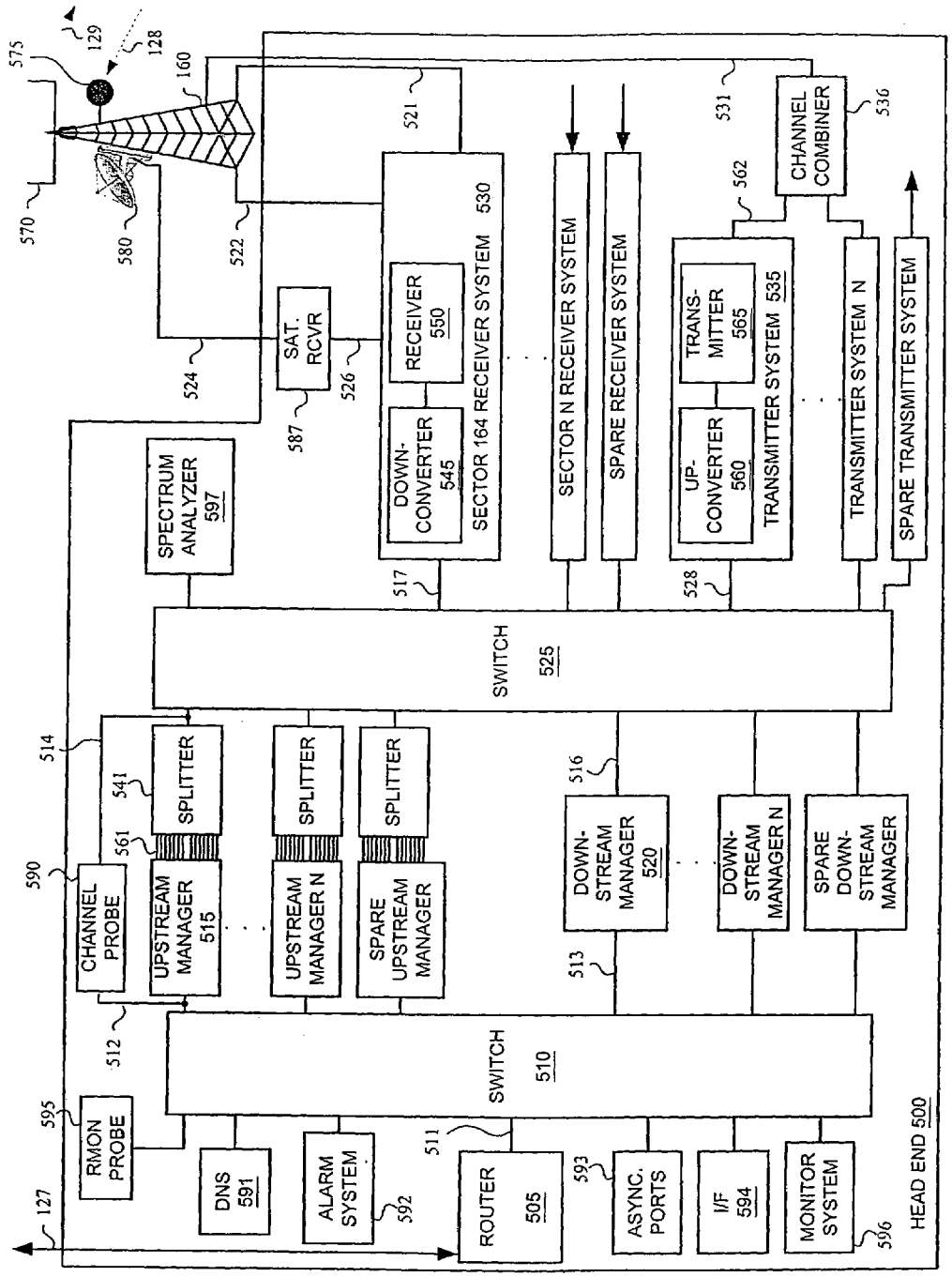
FIG. 5 is a block diagram of a head end in an example of the invention.

FIG. 5 is a block diagram that illustrates the head end 500 in an example of the invention. The head end 500 is comprised of a router 505, a switch 510, an upstream manager 515, a splitter 541, a downstream manager 520, a switch 525, a spectrum analyzer 597, a receiver system 530, a transmitter system 535, a channel combiner 536, an Optical-to-Electrical (O/E) converter 585, a satellite receiver 587, the base antenna 160, a DNS server 591, an alarm system 592, asynchronous ports 593, an interface 594, and a monitor system 596. The receiver system 530 is comprised of a down-converter 545, a receiver 550, and a Low Noise Amplifier (LNA) 555. The transmitter system 535 is comprised of an up-converter 560 and a transmitter 565. The base antenna 160 is comprised of a transmitter antenna 570, a receiver antenna 575, and a satellite antenna 580. The head end 500 also includes a channel probe 590 and an RMON probe 595.

Those skilled in the art will appreciate that the base antenna 160 could be positioned at a high altitude to improve communications. For instance, the base antenna 160 could be positioned on a mountain or a tall building. Consequently, the base antenna 160 could be placed at a remote location in relation to the head end 500. The base antenna 160 has a radial range of approximately 35 miles.

The router 505 is a 7507 router from Cisco Systems. The switch 510 is a 6506 switch from Cisco Systems. The upstream manager 515 is configured to manage data on upstream channels. The upstream manager 515 is a Cyber-Master Upstream Router (CMU-2000-14C) from Hybrid Networks, Inc. The downstream manager 520 is configured to manage data on downstream channels. The downstream manager 520 is a CyberMaster Downstream Router (CMD-2000) from Hybrid Networks, Inc. The switch 525 is a 44 MHz Intermediate Frequency (IF) switch from PESA Switching Systems, Inc. The receiver system 530 is configured to receive a Radio Frequency (RF) signal and convert the RF signal into an IF signal. The receiver system 530 is a receiver from ADC Telecommunications Co. The transmitter system 535 is configured to receive an IF signal, convert the IF signal into a 6 MHz bandwidth RF signal, and transmit the 6 MHz bandwidth RF signal. The base antenna 160 is an antenna from Andrew Corp. The RMON probe 595 is a NetScout probe from NetScout Systems, Inc. that is configured to capture and define traffic information passing through a given point using RMON standards. The channel probe 590 is a Hybrid probe from Hybrid Networks, Inc. that is configured to monitor channel information for the upstream and downstream channels. The DNS server 591 is a Netra 1145 server from Sun Microsystems that is configured to translate the names of host computers to addresses. The alarm system 592 is an AIScout system from Applied Innovations, Inc. that is configured to monitor the broadband wireless system 100. The asynchronous ports 593 are Cisco 2620 asynchronous ports that are configured to provide access to the upstream manager 515 and the downstream manager 520. The interface 594 is a Cybex interface configured to provide a computer interface to the upstream manager 515 and the downstream manager 520. The monitor system 596 is a SCADA system that is configured to monitor the receiver system 530 and the transmitter system 535.

The spectrum analyzer 597 is a Hewlett-Packard HP8590 Spectrum Analyzer. With the spectrum analyzer 597 connected to the switch 525, the switch 525 can receive instructions to connect the spectrum analyzer 597 to various components in the head end 500. This allows a user to remotely control which spectrum of a component the user would like to analyze. To assist in analyzing the spectrum, iPanels for the HP859x may be used.

The router 505 connects with the market hub 400 over the link 127. The router 505 connects with the switch 510 over a link 511. The link 511 is a Gigabit Ethernet connection. The switch 510 connects with the upstream manager 515 over a link 512 and the downstream manager 520 over a link 513. The upstream manager 515 connects with the splitter 541 over links 561. The splitter 541 connects with the switch 525 over a link 514. The downstream manager 520 connects with the switch 525 over a link 516. The links 512–514, 516, and 561 are configured to transport Transmission Control Protocol/Internet Protocol (TCP/IP) packets.

The switch 525 connects with the receiver system 530 over a link 517. The link 517 is configured to transport an IF signal. The receiver system 530 connects with the receiver antenna 575 of the base antenna 160 over a link 521. The link 521 is a wire cable configured to transport an RF signal.

The receiver system 530 connects with the satellite receiver 587 over a link 526. The satellite receiver 587 connects with the satellite antenna 580 on the base antenna 160 over a link 524. The links 526 and 524 are coaxial cables. The receiver system 530 connects to the receiver antenna 575 on the base antenna 160 over a link 521.

The switch 525 connects with the transmitter system 535 over a link 528. The link 528 is configured to transport an IF signal. The transmitter system 535 connects with the channel combiner 536 over a link 562. The channel combiner 536 is also configured to connect with other transmitter systems. The channel combiner 536 connects with the transmitter antenna 570 on the base antenna 160 over a link 531. The link 531 is a wire cable configured to transport an RF signal. Those skilled in the art will appreciate that links 521, 522, 524, and 531 correspond to link 131 in FIG. 1.

The channel probe 590 connects to the links 512 and 514. The channel probe is configured to monitor channel information for the upstream and downstream channels. The RMON probe 595 connects to the switch 510. The RMON probe 595 is configured to capture and define traffic information passing through a given point using RMON standards.

The head end 500 operates as follows. The head end 500 communicates with the market hub 400 and the customer premises 600. The downstream manager 520 routes data to the customer premises 600. The data could be from other components in the broadband wireless system 100. The downstream manger 520 communicates with the other components through the switch 510 and the router 505. The operation of the router 505 and the switch 510 is well known to those skilled in the art and is not discussed for the sake of brevity. The head end 500 could also include a spare downstream manager in case of failure of one of the main downstream managers.

The downstream manager 520 receives packets that contain the data from the switch 510 over the link 513. The downstream manager 520 processes the packets to extract the data. The downstream manager 520 converts the data into an IF signal. The downstream manager 520 transmits the IF signal to the transmitter system 535 through the switch 525 over the links 516 and 528. The head end 500 could also include a spare transmitter system in case of failure of one of the main transmitter systems. The switch 525 switches between the multiple transmitter systems. The up-converter 560 and the transmitter 565 function together to process the IF signal and convert the IF signal into an RF signal having a bandwidth of 6 MHz. The channel combiner 536 combines the RF signals from the transmitter systems and transmits an RF signal to the transmitter antenna 570 over the link 531.

The transmitter antenna 570 is an omni-directional antenna. The transmitter antenna 570 transmits the RF signal to the customer premises 600 on the downstream channels over the link 129. The RF signal is a Multichannel Multipoint Distribution Service (MMDS) signal. The MMDS frequencies range from 2500 MHz to 2686 MHz. The MMDS signals in this example also include the Multipoint Distribution Service (MDS) frequencies. The MDS frequencies comprise MDS1 (2150–2156 MHz) and MDS2 (2156–2162 MHz). The bandwidth of the downstream channels is 6 MHz comprised of three 2 MHz subchannels, each with an approximate throughput of 9 Mbps.

Concurrently, the upstream manager 515 routes data, received from the customer premises 600, to the broadband wireless system 100. The upstream manager 515 communicates with other components in the broadband wireless system 100 through the switch 510 and the router 505.

The upstream manager 515 receives the data from the customer premises 600 through the receiver system 530 and the receiver antenna 575. The receiver antenna 575 is a directional antenna. The receiver antenna 575 forms the sector 164 shown in FIG. 1 based on the direction in which it points. Any communication device that communicates with the receiver antenna 575 is considered within the sector 164. Those skilled in the art will appreciate that the base antenna 160 could include a plurality of receiver antennas that form sectors 161–163 and 165–170. Those skilled in the art will also appreciate that the head end 500 could include a plurality of upstream managers depending on the number of sectors controlled by the head end 500. The head end 500 could also include a spare upstream manager in case of failure of one of the main upstream managers.

The receiver antenna 575 receives an RF signal from the customer premises 600 on the upstream channels over the link 128. The RF signal may be either an MDS signal or an MMDS signal. The bandwidth of the upstream channels is approximately 200 KHz with a throughput of approximately 256 Kbps.

The receiver antenna 575 transfers the RF signal over the link 521 to the receiver system 530. The receiver system 530 corresponds to the sector 164. The receiver 550 and the down-converter 545 function together to process the amplified RF signal and convert the amplified RF signal into an IF signal. The receiver system 530 transfers the IF signal to the splitter 541 through the switch 525 over the links 517 and 514. Those skilled in the art will appreciate that the head end 500 can include a plurality of receiver systems, wherein each receiver system corresponds to a sector. The head end 500 could also include a spare receiver system in case of failure of one of the main receiver systems. The switch 525 switches between multiple receiver systems and multiple upstream managers. For instance, if the head end 500 controls ten sectors, then the switch 525 would connect ten upstream managers to ten receiver systems.

The upstream manager 515 receives the IF signal from the splitter 541 over the links 561. The upstream manager 515 corresponds to the sector 164. The upstream manager 515 processes the IF signal to route the data carried by the IF signal. The upstream manager 515 generates packets and inserts the data, carried by the IF signal, into the packets. The upstream manager 515 transmits the packets to the switch 510 for transmission to other components in the broadband wireless system 100.

The upstream manager 515 also generates control messages for the customer premises 600. The upstream manager 515 transmits these control messages to the downstream manager 520 through the switch 510. The downstream manager 520 transmits the control messages to a wireless broadband router that is located in the customer premises 600. The wireless broadband router is further discussed in FIG. 6. The wireless broadband router communicates with the upstream manager and the downstream manager to exchange data.

The upstream manager 515 separates the upstream channels into subchannels. The upstream manager 515 manages a polling list of numerous wireless broadband routers in sectors 161–170 to allocate use of subchannels. Polling is a round robin process to determine which wireless broadband router has access to a subchannel. The upstream manager 515 maintains a queue of the active wireless broadband routers to determine which wireless broadband router is next to transmit over a subchannel for a period of time.

The upstream manager uses the control messages to grant a wireless broadband router use of a subchannel for a limited period of time. The control messages are credits. A credit is a message that allows usage of a subchannel for a period of time or for the transfer of a maximum number of transmission units such as bytes. One example of a credit includes information such as a subchannel or frequency range, a maximum allowed time to transfer data, and a maximum number of bytes the wireless broadband router is allowed to transfer.

There are two kinds of credits: polling and dedicated. Polling credits are credits related to polling of the wireless broadband routers. Polling credits are generally smaller than the dedicated credits. Once the wireless broadband router completes transfer of the packets, the wireless broadband router transmits a DONE message to the upstream manager 515 via the upstream channels. The DONE messages include information such as the number of bytes sent and the number of packets left for the wireless broadband router to transfer. If the DONE message shows that the wireless broadband router has more than three packets left to transfer and there are available subchannels, then the upstream manager 515 issues a dedicated credit to the wireless broadband router.

The receiver system 530 also receives a 10 MHz signal from the satellite receiver 587. The satellite antenna 580 receives satellite signals and transmits the satellite signals to the satellite receiver 587 over the link 524. The satellite receiver 587 processes the satellite signals to generate the 10 MHz signal. The satellite receiver 587 transmits the 10 MHz signal to the receiver system 530 over the link 526. The receiver system 530 uses the 10 MHz signal as a reference signal.

In some examples, the receiver system 530 communicates with the receiver antenna 575 over the links 522. In this example, the link 522 is a fiber optic cable. Depending on the number of receiver antennas on the base antenna 160, the number of wire cables, such as the link 521, running from the base antenna 160 could become large. A large number of wire cables can be heavy and can add stress to the structure of the base antenna 160. Fiber optic cable, on the other hand, can be lighter than wire cable. Therefore, it may be advantageous to run fiber optic cable between the base antenna 160 and the receiver system 530. In such a case, an optical to electrical converter 585 is used to convert the optical signal to an electrical signal.

Figure 6:
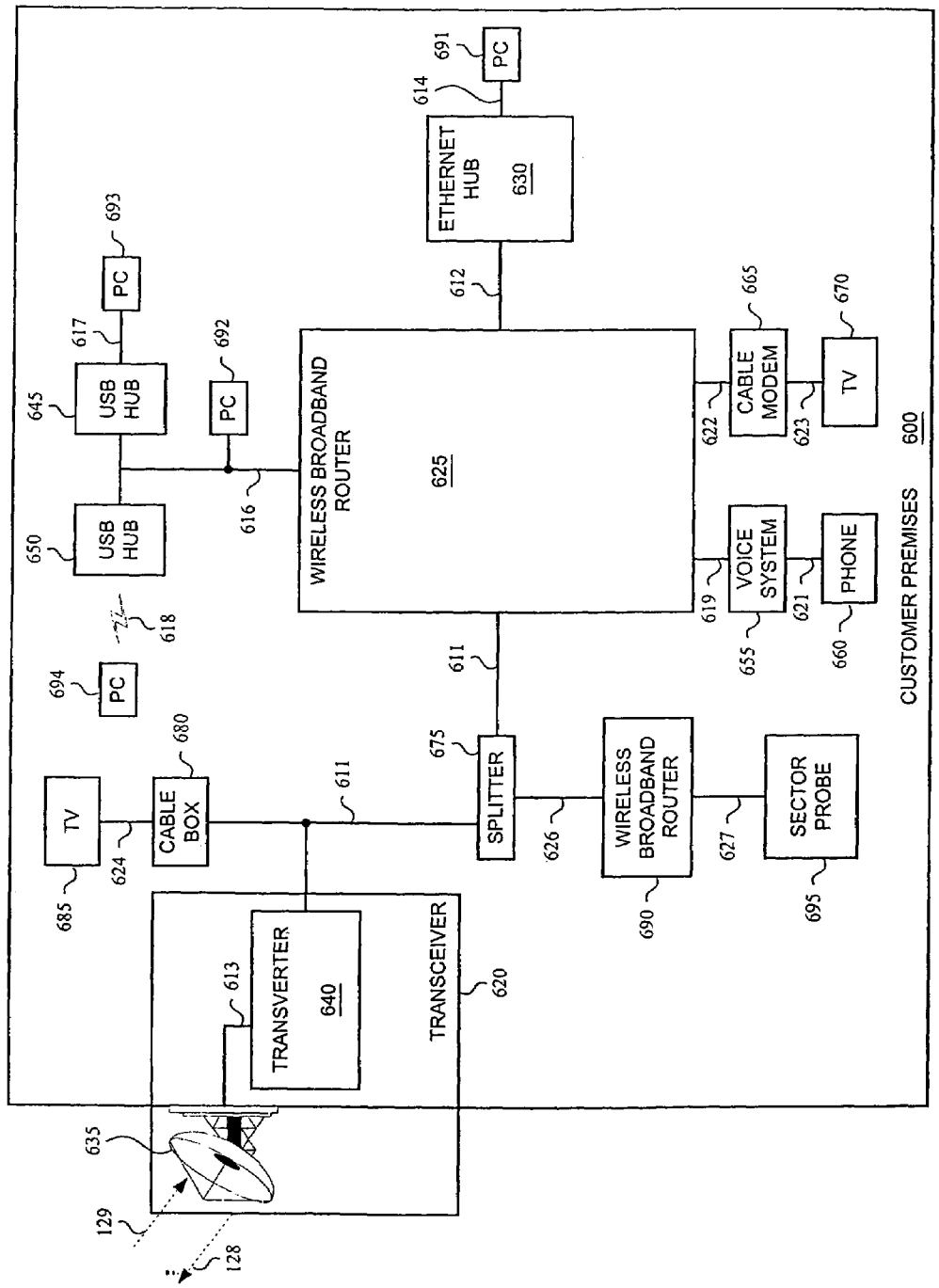
FIG. 6 is a block diagram of a customer premises in an example of the invention.
Figure 7:
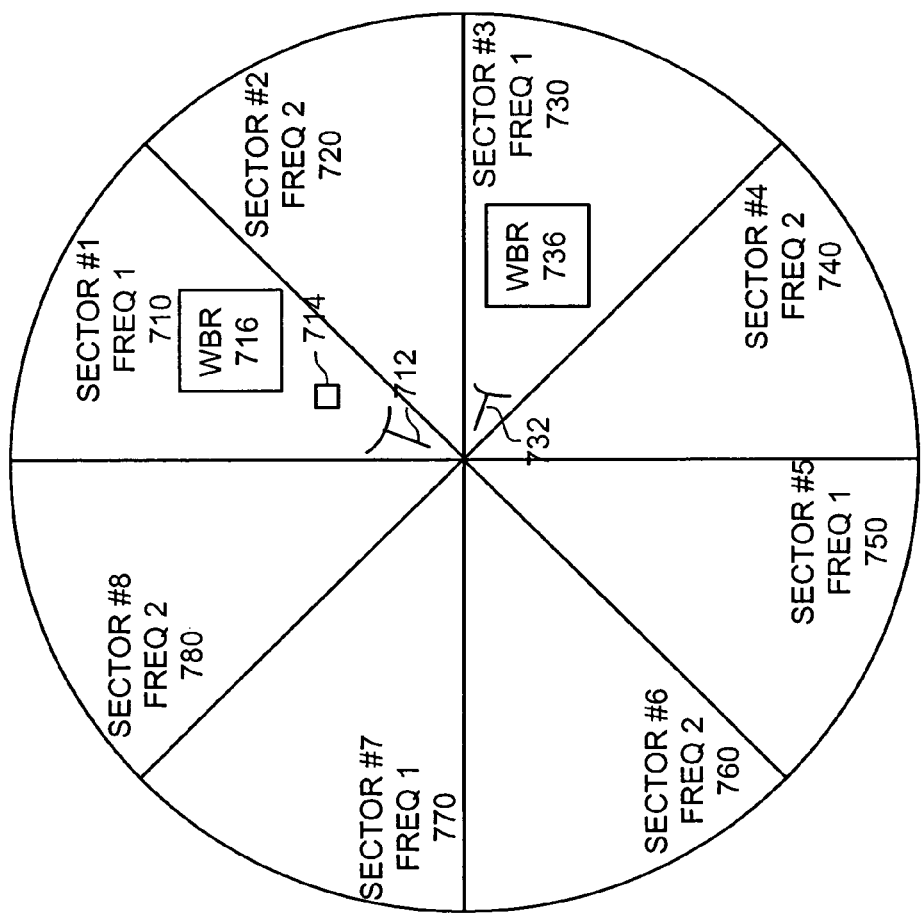
FIG. 7 is an illustration of a sector map of the broadband wireless system in the prior art.

FIG. 6 is a block diagram that illustrates the customer premises 600 in an example of the invention. The customer premises 600 is comprised of a transceiver 620, a wireless broadband router 625, an Ethernet hub 630, and a computer (PC) 691. The transceiver 620 is comprised of a directional antenna 635 and a transverter 640. The customer premises 600 also includes a Universal Serial Bus (USB) hub 645, a USB hub 650, PCs 692–694, a voice system 655, a phone 660, a cable modem 665, a TV 670, a cable box 680, a TV 685, a splitter 675, a wireless broadband router 690, and a sector probe 695.

Examples of the customer premises 600 are residences or businesses. The transceiver 620 is configured to transmit and receive a wireless signal. The transceiver 620 is a transceiver from California Amplifier, Inc. The wireless broadband router 625 is configured to process packets to generate an IF signal, and vice-versa. The wireless broadband router 625 is a Series 2000 Wireless Broadband Router from Hybrid Networks, Inc. The Ethernet hub 630 is configured to interface multiple Ethernet connections. The Ethernet hub 630 is an Ethernet Hub from Netgear.

The USB hub 645 is a USB hub from Lucent Technologies. The USB hub 650 is an 802.11 wireless Ethernet standard hub from Lucent Technologies. The voice system 655 is configured to process voice data that is transmitted over packets. The splitter 675 is a 3 dB splitter. The wireless broadband router 690 is a Series 2000 Wireless Broadband Router from Hybrid Networks, Inc. The sector probe 695 is configured to collect performance information from the customer premises side.

The directional antenna 635 connects with the transverter 640 over a link 613. The link 613 is a coaxial cable. The transverter 640 connects with the wireless broadband router 625 over a link 611. The link 611 is an RG-59 coaxial cable. The wireless broadband router 625 connects with the Ethernet hub 630 over a link 612. The Ethernet hub 630 connects with the PC 691 over a link 614. The links 612 and 614 are Ethernet connections. Those skilled in the art will appreciate that the Ethernet hub 630 could also communicate with a Local Area Network (not shown).

The wireless broadband router 625 connects with a Universal Serial Bus (USB) 616. The USB 616 connects with the PC 692, the USB hub 645, and the USB hub 650. The USB hub 645 connects with the PC 693 over a link 617. The link 617 is an Ethernet connection. The USB hub 650 connects with the PC 694 over a link 618. The link 618 is a wireless Ethernet connection. The wireless broadband router 625 connects with the voice system 655 over a link 619. The voice system 655 connects with the phone 660 over a link 621. The wireless broadband router 625 connects with the cable modem 665 over a link 622. The cable modem 665 connects with the TV 670 over a link 623. The link 623 is a coaxial cable. The cable box 680 connects with the link 611 and is configured to receive a wireless cable television feed. The cable box 680 connects with the TV 685 over a link 624. The link 624 is a coaxial cable.

The link 611 includes the splitter 675. The wireless broadband router 690 connects with the splitter 675 over a link 626. The link 626 is an RG-59 coaxial cable. The wireless broadband router 690 connects with the sector probe 695 over a link 627.

Those skilled in the art will appreciate that the transceiver 620, the cable box 680, the voice system 655, the cable modem 665, the USB hub 645, the USB hub 650, and the Ethernet hub 630 could be incorporated within the wireless broadband router 625.

The customer premises 600 operates as follows. The customer premises 600 communicates with the head end 500. The receive data from the head end 500, the directional antenna 635 receives an RF signal on the downstream channels over the link 129. The directional antenna 635 transfers the RF signal to the transverter 640. The transverter 640 processes the RF signal and converts the RF signal to an IF signal. The transverter 640 transmits the IF signal to the wireless broadband router 625 over the link 611. The wireless broadband router 625 processes the IF signal and converts the IF signal into packets containing the data. The wireless broadband router 625 transmits the packets to the Ethernet hub 630 over the link 612. Those skilled in the art will appreciate that the wireless broadband router 625 could transmit packets to the USB hub 645, the USB hub 650, the PC 692, the voice system 655, and the cable modem 665. The Ethernet hub 630 transmits the packets to the PC 691 over the link 614.

To transmit data to the head end 500, the PC 691 transmits packets, containing data, to the Ethernet hub 630 over the link 614. The Ethernet hub 630 transfers the packets to the wireless broadband router 625 over the link 612. The wireless broadband router 625 processes the packets and converts the data contained in the packets into an IF signal. Those skilled in the art will appreciate that the wireless broadband router 625 could also receive packets from the USB hub 645, the USB hub 650, the PC 692, the voice system 655, and the cable modem 665. The wireless broadband router 625 transfers the IF signal to the transverter 640 over the link 611. The transverter 640 processes the IF signal and converts the IF signal into an RF signal. The transverter 640 also amplifies the RF signal. The transverter 640 transmits the RF signal to the directional antenna 635. The directional antenna 635 transmits the RF signal to the head end 500 on the upstream channels over the link 128.

Communication System—FIGS. 8–11

Figure 8:
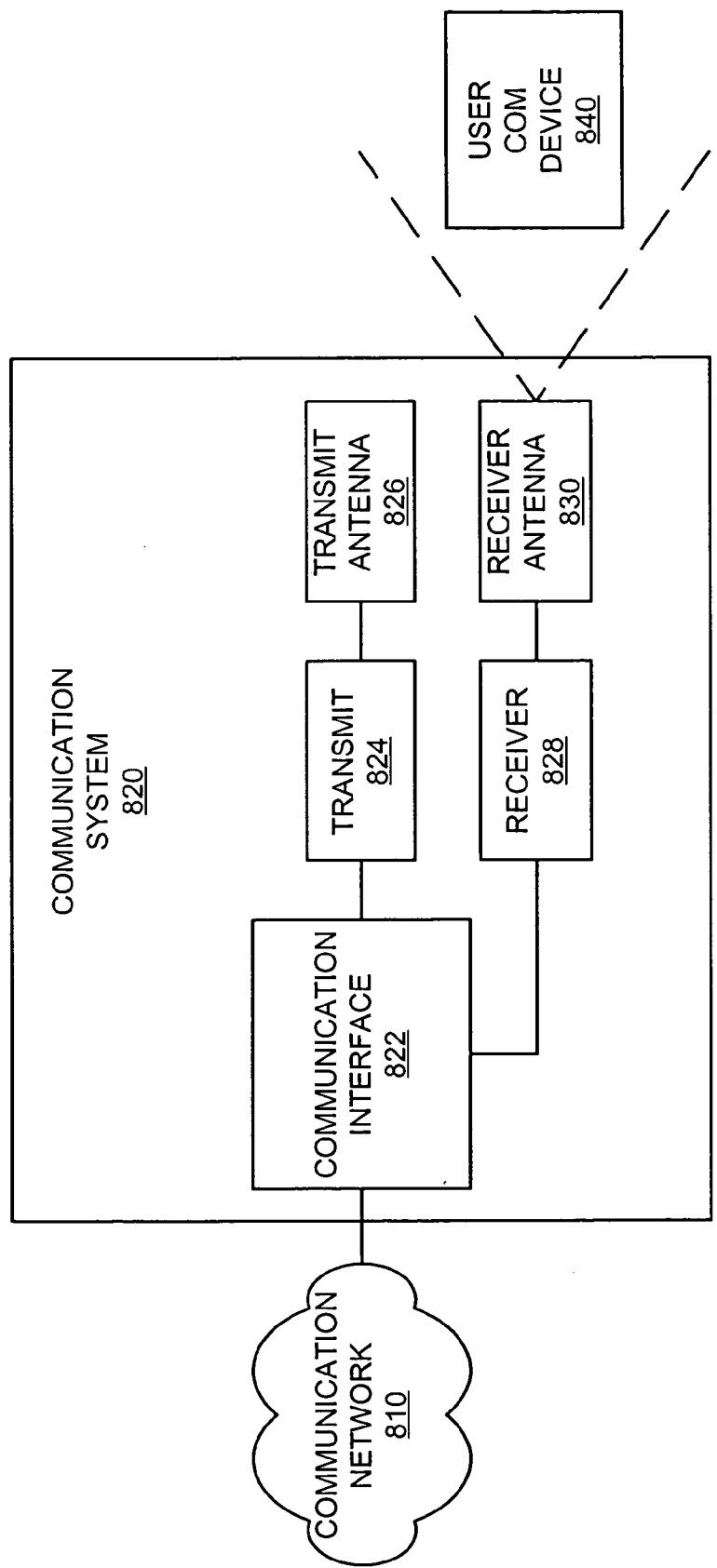
FIG. 8 is a block diagram of a communication system with an antenna of less than forty five degrees in an example of the invention.

FIG. 8 depicts a block diagram of a communication system 820 with an antenna of less than forty five degrees in an example of the invention. FIG. 8 includes a communication network 810, a communication system 820, and a user communication device 840. The communication system 820 comprises a communication interface 822, a transmitter 824, a transmitter antenna 826, a receiver 828, and a receiver antenna 830. The communication network 810 is connected to the communication interface 822. The communication interface 822 is connected to the transmitter 824 and the receiver 828. The transmitter 824 is connected to the transmitter antenna 826. The receiver 828 is connected to the receiver antenna 830.

The communication network 810 is any communication network such as the Internet that may include routers and switches. One example of the communication network 810 includes the switch 510, the router 505, and the Internet 145 as depicted in FIGS. 1 and 5. The communication interface 822 is any interface, device, group of devices, or system configured to provide communication services between the communication network 810 and the user communication device 840. One example of the communication interface 822 is a collection of the upstream managers 515 and the downstream managers 520 as depicted in FIG. 5.

The transmitter 824 is any conventional transmitter configured to transmit wireless signals via the transmitter antenna 826. One example of the transmitter 824 is the transmitter system 570 as depicted in FIG. 5. One example of the transmitter antenna 826 is the transmitter antenna 565 as depicted in FIG. 5. The receiver 828 is any conventional receiver configured to receive wireless signals via the receiver antenna 830. One example of the receiver 828 is the receiver system 530 as depicted in FIG. 5. One example of the receiver antenna 830 is the receiver antenna 575 as depicted in FIG. 5. The user communication device 840 is any communication device configured to exchange communication services for a user. One example of the user communication device 840 is the wireless broadband router 625 as depicted in FIG. 6. In other embodiments, there are other numerous user communication devices 840 in a coverage area or angular area not shown for the sake of clarity.

In this embodiment, the transmitter antenna 826 is an omni-directional antenna configured to transmit wireless signals in the MMDS frequency range. Also, the receiver antenna 830 is a directional antenna configured to receive wireless signals in the MDS frequency range. In another embodiment, the frequencies of the wireless signals are above 1000 MHz. In some embodiments, the receiver antenna 830 is directed towards a coverage area or an angular area of less than forty five degrees. A coverage area or angular area is any geographic area that is within a range of an antenna. Some coverage areas or angular areas are called sectors. There are numerous combinations of transmitters, transmitter antennas, receivers, and receiver antennas for covering a wide geographic area that are not shown for the sake of clarity. In other embodiments, the transmitter 824 and the receiver 828 are combined into one transceiver device. Similarly, the transmitter antenna 826 and the receiver antenna 830 are combined into one antenna.

Figure 9:
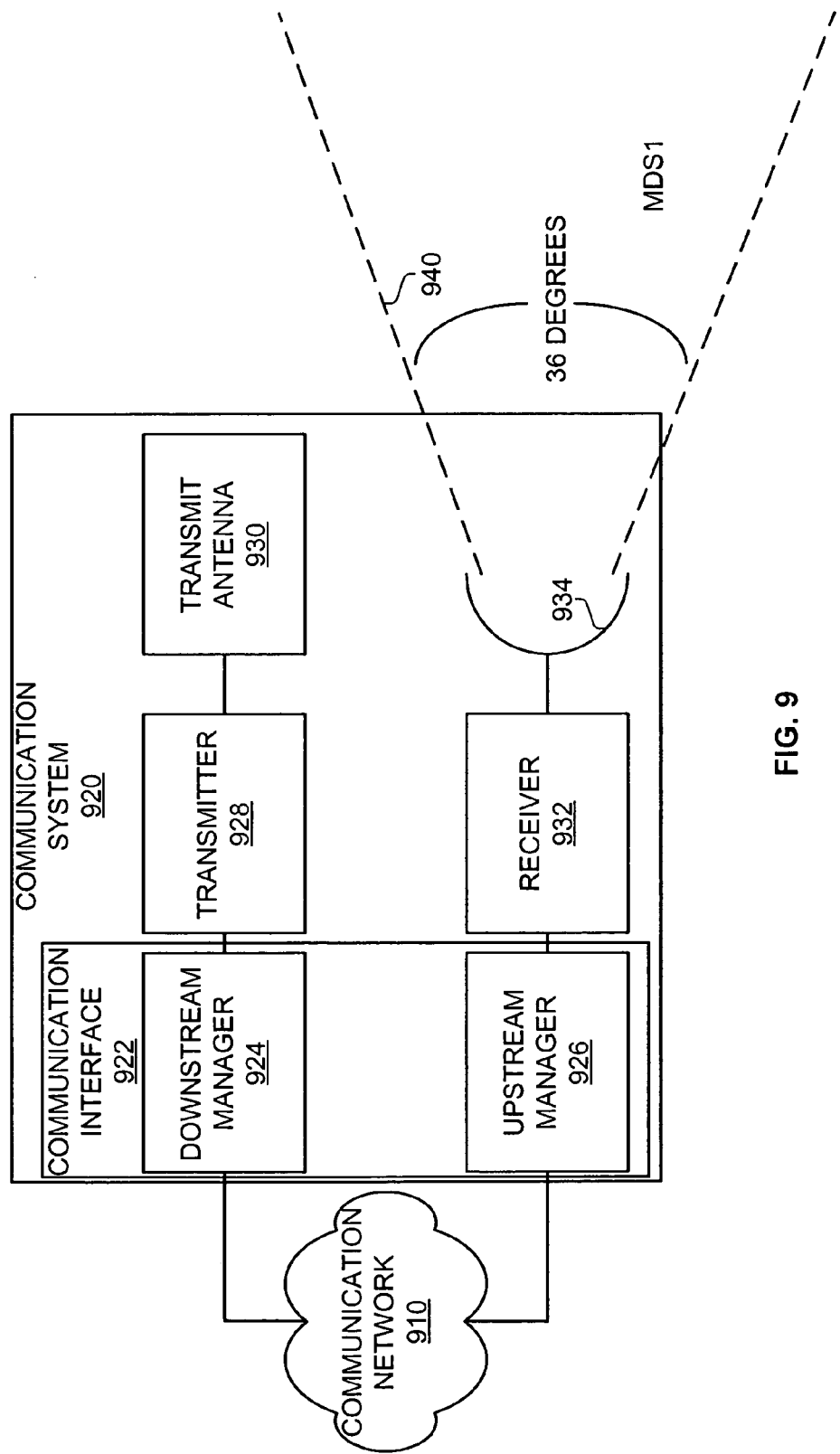
FIG. 9 is an illustration of a communication system with a thirty six degree antenna in an example of the invention.
Figure 10:
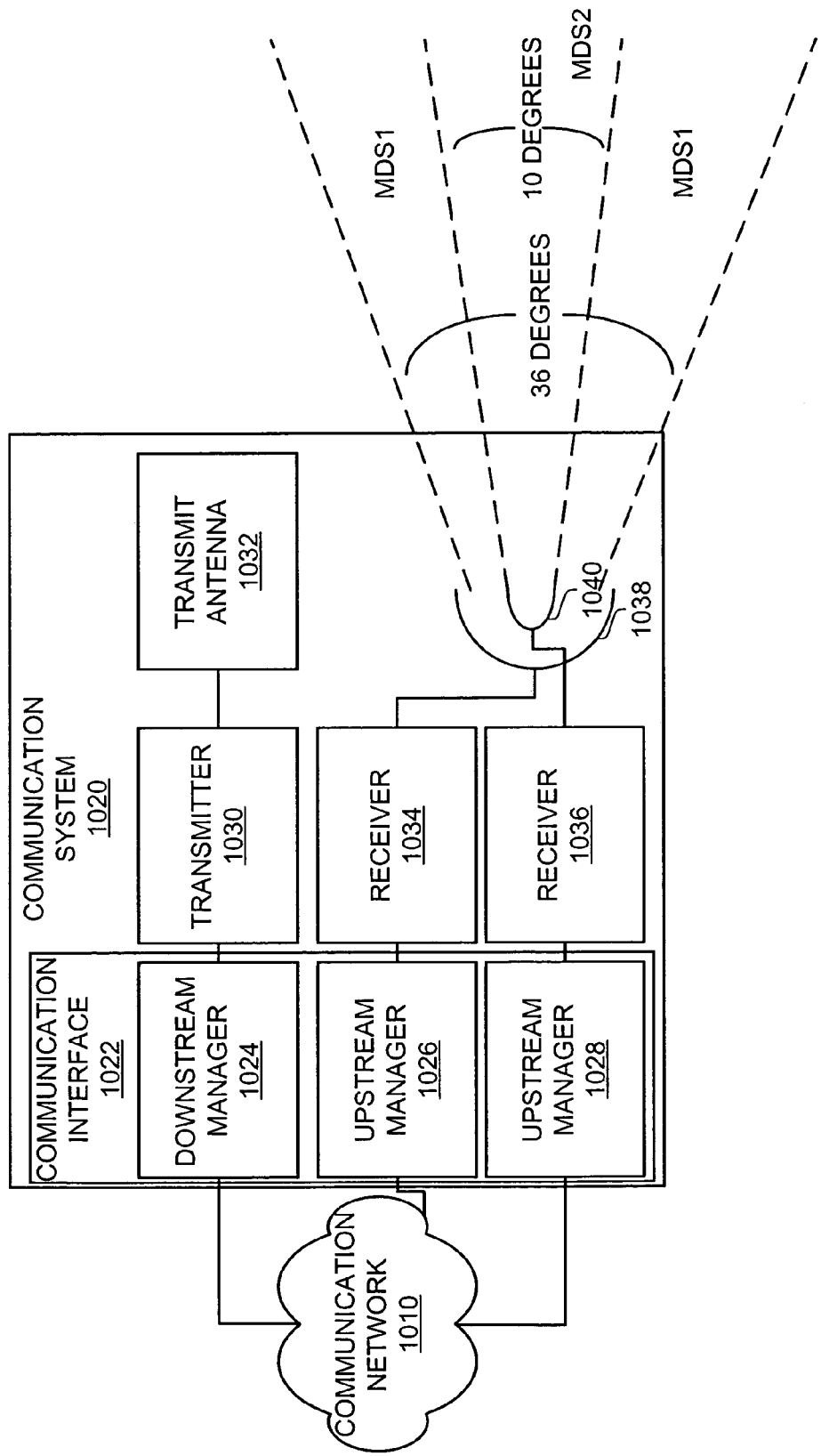
FIG. 10 is an illustration of a communication system with a thirty six degree antenna with a center twelve degree antenna in an example of the invention.
Figure 11:
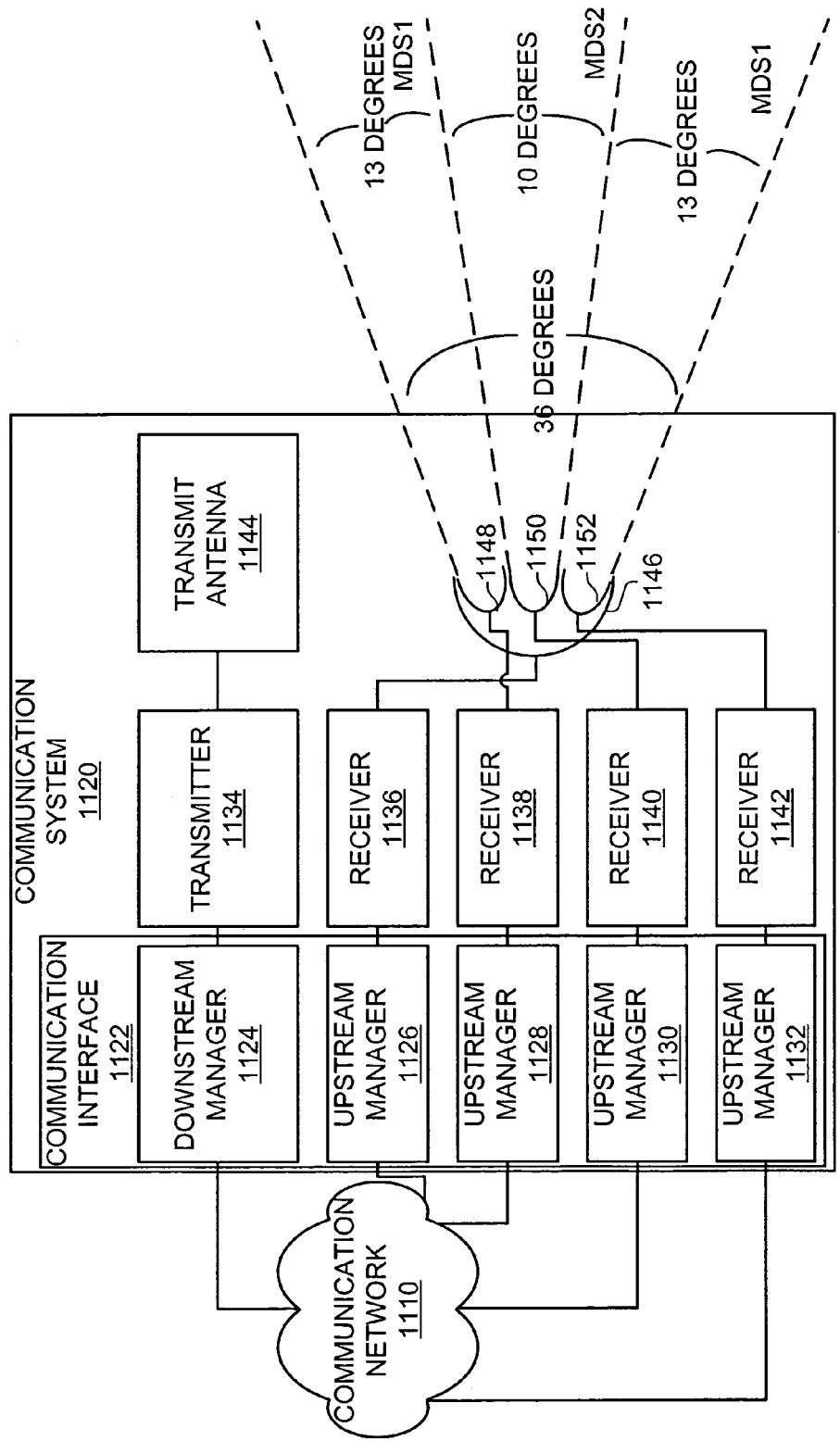
FIG. 11 is an illustration of a communication system with a thirty six degree coverage area with three twelve degree antennas in an example of the invention.

Communication System—FIGS. 9–11

FIGS. 9–11 and the following description depict specific examples of a communication system to teach those skilled in the art how to make and use the best mode of the invention. For the purpose of teaching inventive principles, some conventional aspects of the communication system have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 9 depicts an illustration of a communication system 920 with a thirty six degree antenna in an example of the invention. FIG. 9 includes a communication network 910 and a communication system 920. The communication system 920 comprises a communication interface 922, a transmitter 928, a transmitter antenna 930, a receiver 932, and a receiving antenna 934. The communication interface 922 comprises a downstream manager 924 and an upstream manager 926.

The communication network 910 is connected to the downstream manager 924 and the upstream manager 926. The downstream manger 924 is connected to the transmitter 928. The transmitter 928 is connected to the transmitter antenna 930. The upstream manager 926 is connected to the receiver 932. The receiver 932 is connected to the receiver antenna 934. The receiver antenna 934 is directed towards an angular area 940 of thirty six degrees.

In this embodiment, the communication network 910 represents the switch 510, the router 505, and the Internet 145 as depicted in FIGS. 1 and 5. The downstream manager 924 represents the downstream manager 520 as depicted in FIG. 5. The other downstream managers 520 in FIG. 5 are not depicted in FIG. 9 for the sake of clarity. The upstream manager 926 represents the upstream manager 515 as depicted in FIG. 5. The other upstream managers 515 in FIG. 5 are not depicted in FIG. 9 for the sake of clarity.

In this embodiment, the transmitter antenna 930 is an omni-directional antenna configured to transmit wireless signals in the MMDS frequency range. The transmitter 928 represents the transmitter system 535 as depicted in FIG. 5, and the transmitter antenna 930 represents the transmitter antenna 565 as depicted in FIG. 5. The receiver 932 represents the receiver system 530 as depicted in FIG. 5. The receiver antenna 934 is a directional antenna configured to receive signals in the MDS1 frequency range. The receiver antenna 934 is a thirty six degree antenna that is directed towards the angular area of thirty six degrees. Thus, ten receivers 932 and ten receiver antennas 934 would cover a three hundred and sixty degree geographic area.

In operation, the downstream manager 924 transfer signals from the communication network 910 to the transmitter 928. The transmitter 928 then transmits wireless signals via the transmit antenna 930. The user communication devices in the angular area 940 then receive the wireless signals. In this embodiment, the user communication devices are the wireless broadband routers of FIG. 5. The user communication devices then transmit wireless signals to the receiver 932. The receiver 932 receives the wireless signals via the receiver antenna 934. The upstream manager 926 then transfers the signals to the communication network 910.

FIG. 10 depicts an illustration of a communication system 1020 with a thirty six degree antenna with a center twelve degree antenna in an example of the invention. FIG. 10 includes a communication network 1010 and a communication system 1020. The communication system 1020 comprises a communication interface 1022, a transmitter 1030, a transmitter antenna 1032, a receiver 1034, a receiver 1036, a receiving antenna 1038, and a receiving antenna 1040. The communication interface 1022 comprises a downstream manager 1024, an upstream manager 1026, and an upstream manager 1028.

The communication network 1010 is connected to the downstream manger 1024, the upstream manager 1026, and the upstream manager 1028. The downstream manager 1024 is connected to the transmitter 1030. The transmitter 1030 is connected to the transmitter antenna 1032. The upstream manager 1026 is connected to the receiver 1034. The receiver 1034 is connected to the receiver antenna 1038. The upstream manager 1028 is connected to the receiver 1036. The receiver 1036 is connected to the receiver antenna 1040.

The receiver antenna 1040 is a Decibel Horizontally Polarized Twelve Degree antenna. Model #DB973HG12ERR. The receiver antenna 1038 is directed towards an angular area of thirty six degrees. The receiver antenna 1040 is directed towards an angular area of ten degrees that is in the center of the angular area of thirty six degrees. In this embodiment, the thirty six degree coverage area is separated into two side thirteen degree coverage area and one ten degree coverage area due to antenna patterns of the thirty six degree antenna.

In operation, the downstream manager 1024 transfer signals from the communication network 1010 to the transmitter 1030. The transmitter 1030 then transmits wireless signals via the transmitter antenna 1032. In this embodiment, the transmitter antenna 1032 is an omni-directional antenna configured to transmit wireless signals in the MMDS frequency range. The user communication devices in the angular area then receive the wireless signals. In this embodiment, the user communication devices are the wireless broadband routers of FIG. 5.

The user communication devices in the center ten degree angular area then transmit wireless signals to the receiver 1036. The receiver 1036 then receives the wireless signals in the MDS2 frequency range via the receiver antenna 1040. The upstream manager 1026 then transfers the signals to the communication network 1010. The user communication devices in the thirty six degree angular area and not in the center ten degree angular area then transmit wireless signals to the receiver 1034. The receiver 1034 receives the wireless signals in the MDS1 frequency range via the receiver antenna 1038. The upstream manager 1028 then transfers the signals to the communication network 1010.

FIG. 11 depicts an illustration of a communication system 1120 with a thirty six degree coverage area with three twelve degree antennas in an example of the invention. FIG. 11 includes a communication network 1110 and a communication system 1120. The communication system 1120 comprises a communication interface 1122, a transmitter 1134, a transmitter antenna 1144, a receiver 1136, a receiver 1138, a receiver 1140, a receiver 1142, a receiving antenna 1146, a receiving antenna 1148, a receiving antenna 1150, and a receiving antenna 1152. The communication interface 1122 comprises a downstream manager 1124, an upstream manager 1126, an upstream manager 1128, an upstream manager 1130, and an upstream manager 1132.

The communication network 1110 is connected to the downstream manager 1124, the upstream manager 1126, the upstream manager 1128, the upstream manager 1130, and the upstream manager 1132. The downstream manager 1124 is connected to the transmitter 1134. The transmitter 1134 is connected to the transmitter antenna 1144.

The upstream manager 1126 is connected to the receiver 1136. The receiver 1136 is connected to the receiver antenna 1146. The upstream manager 1128 is connected to the receiver 1138. The receiver 1138 is connected to the receiver antenna 1148. The upstream manager 1130 is connected to the receiver 1140. The receiver 1140 is connected to the receiver antenna 1150. The upstream manager 1132 is connected to the receiver 1142. The receiver 1142 is connected to the receiver antenna 1152.

The receiver antenna 1148, 1150, and 1152 are Decibel Horizontally Polarized Twelve Degree antennas, Model #DB973HG12ERR. The receiver antenna 1148 and the receiver antenna 1152 are directed towards an angular area of thirteen degrees. The receiver antenna 1148 and the receiver antenna 1152 are configured to receive wireless signals in the MDS1 frequency range. The receiver antenna 1150 is directed towards an angular area of ten degrees. The receiver antenna 1150 is configured to receive wireless signals in the MDS2 frequency range. The receiver antenna 1146 is a thirty six degree antenna. The receiver antenna 1146 is directed towards an angular area of thirty six degrees. The operation of the communication system 1120 is similar to the communication system 920 and the operation of the communication system 1020 discussed above, and the operation of the communication system 1120 is not discussed for the sake of brevity.

In another embodiment, the receiver antenna 1146 is removed from the communication system 1120. In another embodiment, the receiver antenna 1150 are twenty four degree antennas, and the three hundred and sixty degree coverage area is separated into fifteen twenty four degree sectors. There are numerous combinations to separate the three hundred and sixty degree coverage area into smaller coverage areas or sectors.

When a three hundred and sixty degree coverage area is divided into smaller coverage areas, the capacity of users in the communication systems is increased because more equipment is used to serve the smaller coverage areas. For example, the broadband wireless system above has more upstream managers to serve smaller sectors, which increases the overall capacity of the broadband wireless system. Also, with smaller coverage area, users have better response time because their respective equipment for the smaller coverage area handles less overall users. Smaller coverage area also reduces interference problems associated with re-reflection.

The invention claimed is:

1. A communication system for providing communication services to user communication devices, the communication system comprising:
    a omni-directional transmitting base antenna at a first location where the first location is not a customer premise;
    a transmitter connected to the transmitting antenna and configured to transmit first wireless signals via the transmitting antenna;
    a first directional receiving antenna at the first location wherein an angle of the first directional receiving antenna is 36 degrees and the first directional receiving antenna is directed toward a first angular area of 36 degrees;
    a second directional receiving antenna at the first location wherein an angle of the second directional receiving antenna is 12 degrees and the second directional receiving antenna is directed toward a second angular area of 12 degrees and where the second angular area is contained within the first angular area;
    at least one receiver connected to the first and second directional receiving antennas and configured to receive a second and third wireless signals via the first and second directional receiving antennas wherein the second and third wireless signals are in the Multichannel Multipoint Distribution Service (MMDS) frequency range; and
    a communication interface connected to the transmitter, the receiver, and a communication network and configured to provide the communication services between the communication network and the user communication devices.

2. The communication system of claim 1 wherein the first wireless signals are in the Multichannel Multipoint Distribution Service (MMDS) frequency range.

3. The communication system of claim 1 wherein the first wireless signals are in the Multipoint Distribution Service (MDS) frequency range.

4. The communication system of claim 1 wherein the user communication devices comprise wireless broadband routers.

5. The communication system of claim 1 wherein the communication interface comprises a downstream manager.

6. The communication system of claim 1 wherein the communication interface comprises an upstream manager.

7. A communication system for providing communication services to user communication devices, the communication system comprising:
    a omni-directional transmitting base antenna at a first location where the first location is not a customer premise;

a transmitter connected to the transmitting antenna and configured to transmit first wireless signals via the transmitting antenna;

a first directional receiving antenna at the first location wherein an angle of the first directional receiving antenna is 36 degrees and the first directional receiving antenna is directed toward a first angular area of 36 degrees;

a second directional receiving antenna at the first location wherein an angle of the second directional receiving antenna is 12 degrees and the second directional receiving antenna is directed toward a second angular area of 12 degrees and where the second angular area is contained within the first angular area;

at least one receiver connected to the first and second directional receiving antennas and configured to receive second and third wireless signals via the first and second directional receiving antennas wherein the second and third wireless signals are in the Multipoint Distribution Service (MDS) frequency range; and a communication interface connected to the transmitter, the receiver, and a communication network and configured to provide the communication services between the communication network and the user communication devices.

8. A method for providing communication services to user communication devices, the method comprising:

transmitting first wireless signals from a transmitter via a omni-directional transmitting base antenna at a first location where the first location is not a customer premise;

receiving second wireless signals, wherein the second wireless signals are in the Multichannel Multipoint Distribution Service (MMDS) frequency range, into a receiver via a first directional receiving antenna at the first location wherein an angle of the first directional receiving antenna is 36 degrees and the first directional receiving antenna is directed toward an angular area of 36 degrees;

receiving third wireless signals, wherein the third wireless signals are in the Multichannel Multipoint Distribution Service (MMDS) frequency range, into a receiver via a second directional receiving antenna at the first location wherein an angle of the second directional receiving antenna is 12 degrees and the second directional receiving antenna is directed toward an angular area of 12 degrees and where the angle of the second directional receiving antenna is contained within the angle of the first directional receiving antenna; and in a communication interface, providing communication services between a communication network and the user communication devices wherein the communication interface is connected to the transmitter, the receiver, and the communication network.

9. The method of claim 8 wherein the first wireless signals are in the Multichannel Multipoint Distribution Service (MMDS) frequency range.

10. The method of claim 8 wherein the first wireless signals are in the Multipoint Distribution Service (MDS) frequency range.

11. The method of claim 8 wherein the user communication devices comprise wireless broadband routers.

12. The method of claim 8 wherein the communication interface comprises a downstream manager.

13. The method of claim 8 wherein the communication interface comprises an upstream manager.

14. A method for providing communication services to user communication devices, the method comprising:

transmitting first wireless signals from a transmitter via a omni-directional transmitting base antenna at a first location where the first location is not a customer premise;

receiving second wireless signals, wherein the second wireless signals are in the Multipoint Distribution Service (MDS) frequency range, into a receiver via a first directional receiving antenna at the fist location wherein an angle of the first directional receiving antenna is 36 degrees and the first directional receiving antenna is directed toward an angular area of 36 degrees;

receiving third wireless signals, wherein the third wireless signals are in the Multipoint Distribution Service (MDS) frequency range, into a receiver via a second directional receiving antenna at the first location wherein an angle of the second directional receiving antenna is 12 degrees and the second directional receiving antenna is directed toward an angular area of 12 degrees and where the angle of the second directional receiving antenna is contained within the angle of the first directional receiving antenna; and in a communication interface, providing communication services between a communication network and the user communication devices wherein the communication interface is connected to the transmitter, the receiver, and the communication network.

* * * * *